United States Patent
Oota

(10) Patent No.: US 8,481,225 B2
(45) Date of Patent: Jul. 9, 2013

(54) MEMBRANE ELECTRODE ASSEMBLY, MANUFACTURING METHOD THEREOF AND FUEL CELL

(75) Inventor: Masashi Oota, Tokyo (JP)

(73) Assignee: Toppan Printing Co., Ltd. (JP)

( * ) Notice: Subject to any disclaimer, the term of this patent is extended or adjusted under 35 U.S.C. 154(b) by 423 days.

(21) Appl. No.: 12/765,764

(22) Filed: Apr. 22, 2010

(65) Prior Publication Data

US 2010/0273086 A1  Oct. 28, 2010

(30) Foreign Application Priority Data

Apr. 23, 2009  (JP) ................................. 2009-104703

(51) Int. Cl.
*H01M 8/10* (2006.01)
(52) U.S. Cl.
USPC ........................... 429/483; 429/492; 429/523
(58) Field of Classification Search
None
See application file for complete search history.

(56) References Cited

U.S. PATENT DOCUMENTS

| | | | | |
|---|---|---|---|---|
| 5,134,042 A | * | 7/1992 | Madou et al. | 429/409 |
| RE41,651 E | * | 9/2010 | Kosako et al. | 429/480 |
| 2006/0269828 A1 | * | 11/2006 | Tanaka et al. | 429/44 |

FOREIGN PATENT DOCUMENTS

| | | |
|---|---|---|
| JP | 2003-197218 | 7/2003 |
| JP | 2005-108770 | 4/2005 |
| JP | 2005-294123 | 10/2005 |

* cited by examiner

*Primary Examiner* — John S Maples
(74) *Attorney, Agent, or Firm* — Squire Sanders (US) LLP

(57) ABSTRACT

The present invention provides a membrane electrode assembly (MEA) which has a high level of power generation performance under a low humidified condition and a high level of production efficiency, and further, a manufacturing method of such an MEA and a fuel cell having such an MEA. The present invention includes forming first electrode catalyst layer 2, forming polymer electrolyte layer 1 on the first electrode catalyst layer 2 in such a way that a cross sectional surface of the first electrode catalyst layer 2 is also covered with the polymer electrolyte layer 1, and forming second electrode catalyst layer 3 on the polymer electrolyte layer 1 in such a way that a cross sectional surface of the second electrode catalyst layer 3 is covered with the polymer electrolyte layer 1.

6 Claims, 4 Drawing Sheets

Area 1: Total area of polymer electrolyte layer
Area 2: Total area of 1st (or 2nd) electrode catalyst layer
P1: The same plane of polymer electrolyte layer as 1st electrode catalyst layer
P2: The same plane of polymer electrolyte layer as 2nd electrode catalyst layer

MEMBRANE ELECTRODE ASSEMBLY, MANUFACTURING METHOD THEREOF AND FUEL CELL

CROSS REFERENCE TO RELATED APPLICATION

This application is based on and claims the benefit of priority from the Japanese Patent Application number 2009-104703, filed on Apr. 23, 2009, the entire contents of which are incorporated herein by reference.

BACKGROUND OF THE INVENTION

1. Field of the Invention

The present invention relates to a membrane electrode assembly (also referred to as an MEA), a manufacturing method thereof and a fuel cell. In particular, the present invention relates to an MEA which has a high level of power generation performance, and a manufacturing method thereof and a polymer electrolyte fuel cell (PEFC) or proton exchange membrane fuel cell (PEMFC) using the MEA.

2. Description of the Related Art

Fuel cells are power generation systems which produce electric power along with heat. A fuel gas including hydrogen and an oxidant gas including oxygen reacts together at electrodes containing catalyst so that the reverse reaction of water electrolysis takes place in a fuel cell. Fuel cells are attracting attention as a clean energy source of the future since they have advantages such as a small impact on the environment and a low level of noise production relative to conventional power generation systems. Fuel cells are divided into several types according to the employed ion conductor. A fuel cell which uses an ion-conductive polymer membrane is called a polymer electrolyte fuel cell (PEFC) or proton exchange membrane fuel cell (PEMFC).

Among various fuel cells, a PEFC (or PEMFC), which can be used at around room temperature, is considered as a promising fuel cell for use in a vehicle and a household stationary power supply etc. and is being developed widely in recent years. A joint unit which has a pair of electrode catalyst layers on both sides of a polymer electrolyte membrane and which is called a membrane electrode assembly (MEA) is arranged between a pair of separators, on which either a gas flow path for supplying a fuel gas including hydrogen to one of the electrodes or a gas flow path for supplying an oxidant gas including oxygen to the other electrode is formed, in the PEFC (or PEMFC). The electrode for supplying a fuel gas is called a fuel electrode or cathode (electrode), whereas the electrode for supplying an oxidant gas is called an air electrode or anode (electrode). Each of the electrodes includes an electrode catalyst layer, which has stacked polymer electrolytes with carbon particles on which a catalyst such as a noble metal of platinum group is loaded, and a gas diffusion layer which has gas permeability and electron conductivity.

Conventionally, various manufacturing methods of membrane electrode assembly have been studied to improve the fuel cell performance. Examples of the manufacturing method of membrane electrode assembly include a method in which a catalyst layer is formed as an electrode by coating a coating liquid containing a catalyst onto the ion-exchange membrane and the electrode and the ion-exchange membrane are joined by a heat treatment such as hot press to make the membrane electrode assembly, a method in which a catalyst layer is formed on a substrate film that is prepared independently of an ion-exchange membrane and the ion-exchange membrane is stacked on the catalyst layer to transfer the catalyst layer onto the ion-exchange membrane by the hot press, a method in which an electrode sheet in which the catalyst layer is formed is prepared on a gas diffusion layer to join the electrode sheet to the ion-exchange membrane, and a method in which two sets of half cells in which the catalyst layer is formed on the ion-exchange membrane are prepared, surfaces of the ion-exchange membrane sides are pressure-bonded while faced to each other, thereby manufacturing the membrane electrode assembly.

<Patent document 1> JP-A-2003-197218
<Patent document 2> JP-A-2005-294123
<Patent document 3> JP-A-2005-108770

The membrane electrode assemblies manufactured by these methods, however, are made using a heat press such as hot press etc. for combining the electrode catalyst layers with the ion-exchange membrane. Since such a heat press becomes a critical (bottle-neck) process and causes an increase in the tact time, there is a problem of fall of production efficiency.

In addition, membrane electrode assemblies manufactured by the heat press such as hot press etc. is liable to be dried up because the moisture is easily lost from the cross sectional surfaces of the catalyst layer, which is left exposed and uncovered with the catalyst layers unlike the facing surface, which is covered with the membrane. As a result, there is also a problem of decrease in power generation performance under a low humidified condition in which only moisture produced by the fuel cell reaction is supplied. Membrane electrode assemblies which operate on such a low humidified condition, however, will rather be required in the future.

<Patent document 1> to <Patent document 3> are examples of reporting sequentially stacked MEAs in which a first electrode catalyst layer is formed on a substrate followed by forming a polymer electrolyte layer and a second electrode catalyst layer. Although descriptions relating to improving production efficiency are written in these examples, improvement of moisture retention capability and power generation performance under a low humidified condition have not been achieved in these examples.

SUMMARY OF THE INVENTION

The present invention aims to provide a membrane electrode assembly (MEA) having a high level of power generation performance under a low humidified condition, a manufacturing method of such an MEA, and a fuel cell including such an MEA and having a high level of power generation performance under a low humidified condition.

A first aspect of the present invention is a membrane electrode assembly including a polymer electrolyte layer, a first electrode catalyst layer and a second electrode catalyst layer, at least one cross sectional surface of the first electrode catalyst layer and/or the second electrode catalyst layer having a contact with the polymer electrolyte layer.

A second aspect of the present invention is a membrane electrode assembly including a polymer electrolyte layer, a first electrode catalyst layer and a second electrode catalyst layer, all cross sectional surfaces of the first electrode catalyst layer and/or all cross sectional surfaces of the second electrode catalyst layer being covered with the polymer electrolyte layer.

A third aspect of the present invention is the membrane electrode assembly according to the second aspect of the present invention, wherein in part the polymer electrolyte layer is formed in the same plane as the first electrode catalyst layer and total area of parts of the polymer electrolyte layer which are formed in the same plane as the first electrode catalyst layer is four or more times larger than an area of the first electrode catalyst layer.

A fourth aspect of the present invention is the membrane electrode assembly according to the second aspect of the present invention, wherein in part the polymer electrolyte layer is formed in the same plane as the second electrode catalyst layer and total area of parts of the polymer electrolyte layer which are formed in the same plane as the second electrode catalyst layer is four or more times larger than an area of the second electrode catalyst layer.

A fifth aspect of the present invention is the membrane electrode assembly according to the third or fourth aspect of the present invention, wherein an identical polymer electrolyte material is contained in the polymer electrolyte layer and the first electrode catalyst layer.

A sixth aspect of the present invention is a fuel cell including the membrane electrode assembly according to the fifth aspect of the present invention, a pair of gas diffusion layers and a pair of separators, wherein the membrane electrode assembly is interposed between the pair of gas diffusion layers and the pair of gas diffusion layers are interposed between the pair of separators.

A seventh aspect of the present invention is a method for manufacturing membrane electrode assembly including coating a catalyst ink, for forming a first electrode catalyst layer, which includes catalyst loaded particles, a polymer electrolyte and a solvent on a substrate to form a first coated layer, evaporating the solvent in the first coated layer to form the first electrode catalyst layer, coating an electrolyte ink which includes a polymer electrolyte and a solvent on the first electrode catalyst layer to form a coated electrolyte layer which covers the first electrode catalyst layer in directions including a cross sectional surface direction, evaporating the solvent in the coated electrolyte layer to form a polymer electrolyte layer, coating a catalyst ink, for forming a second electrode catalyst layer, which comprises catalyst loaded particles, a polymer electrolyte and a solvent on the polymer electrolyte layer to form a second coated layer in a way that the second coated layer is covered with the polymer electrolyte layer in directions including a cross sectional surface direction; and evaporating the solvent in the second coated layer to form the second electrode catalyst layer.

An eighth aspect of the present invention is the method according to the seventh aspect of the present invention, wherein the polymer electrolyte layer formed in the same plane as said first electrode catalyst layer is at least four times larger in area than the first electrode catalyst layer.

An ninth aspect of the present invention is the method according to the seventh aspect of the present invention, wherein the polymer electrolyte layer formed in the same plane as said second electrode catalyst layer is at least four times larger in area than the first electrode catalyst layer.

A tenth aspect of the present invention is the method according to the eighth or ninth aspect of the present invention, wherein a viscosity of electrolyte ink is in the range of 100-300 cP.

An eleventh aspect of the present invention is the method according to the tenth aspect of the present invention, wherein the polymer electrolyte in the catalyst ink for forming the first electrode catalyst layer and the polymer electrolyte in the electrolyte ink are identical polymer materials.

A twelfth aspect of the present invention is a membrane electrode assembly manufactured by the method according to the eleventh aspect of the present invention.

An thirteenth aspect of the present invention is a fuel cell including the membrane electrode assembly according to the twelfth aspect of the present invention, a pair of gas diffusion layers and a pair of separators, wherein the membrane electrode assembly is interposed between the pair of gas diffusion layers and the pair of gas diffusion layers are interposed between the pair of separators.

The present invention provides a membrane electrode assembly having a high level of production efficiency and a high level of power generation performance especially under a low humidified condition because a cross sectional surface (or preferably all cross sectional surfaces) of an electrode catalyst layer of the MEA is/are covered with the polymer electrolyte layer so that the electrode catalyst layers retain moisture and the MEA obtains a high level of proton conductivity even under a low humidified condition. The present invention provides a manufacturing method of such an MEA.

Moreover, the present invention provides an effect of reduction of ionic conductivity due to a better electrical contact between the polymer electrolyte layer and the electrode catalyst layers relative to the case where the MEA is manufactured using a hot press

DESCRIPTION OF REFERENCE NUMERALS AND SIGNS

1: Polymer electrolyte layer, 1": Electrolyte ink, 1': Coated layer, 2: First electrode catalyst layer, 2": Catalyst ink for first electrode catalyst layer, 2': Coated layer, 3: Second electrode catalyst layer, 3": Catalyst ink for second electrode catalyst layer, 3': Coated layer, A: MEA (=Membrane electrode assembly), S: Substrate, 4: Gas diffusion layer on fuel electrode, 5: Gas diffusion layer on air electrode, 6: Fuel electrode (Anode), 7: Air electrode (Cathode), 8: Gas flow path, 9: Cooling water path, 10: Separator

DETAILED DESCRIPTION OF THE INVENTION

A membrane electrode assembly (MEA), a manufacturing method thereof and a fuel cell of the present invention will be described below. The present invention is not limited to the following embodiments, but various modifications of the design can be made based on the knowledge of those skilled in the art, and the embodiments with the modifications should be included in the scope of the present invention.

Figure 1A:
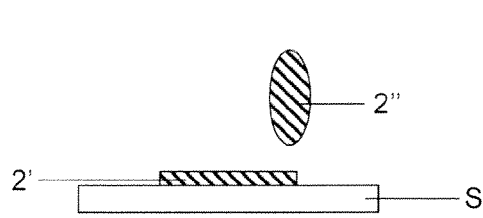
FIGS. 1A to 1H illustrate schematic cross sectional diagrams of a manufacturing process of an MEA of the present invention.
Figure 1E:
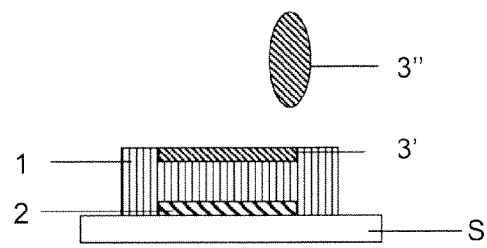
Figure 1B:
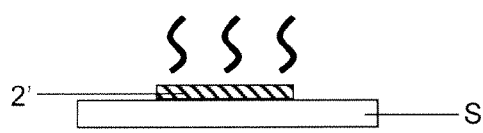
Figure 1F:
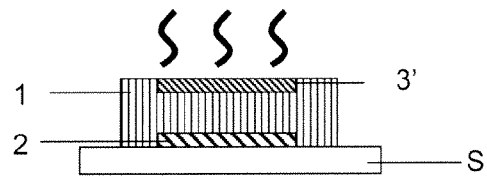
Figure 1C:
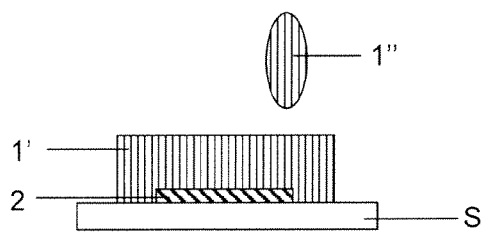
Figure 1G:
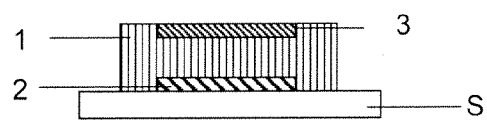
Figure 1D:
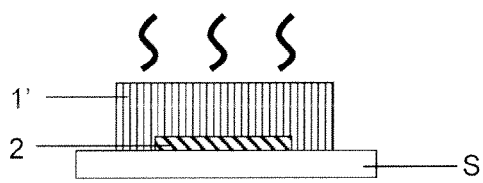
Figure 1H:
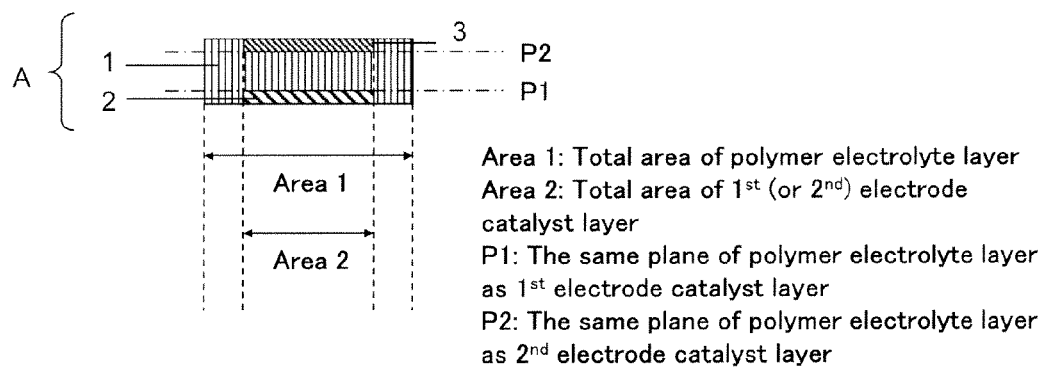
Figure 2:
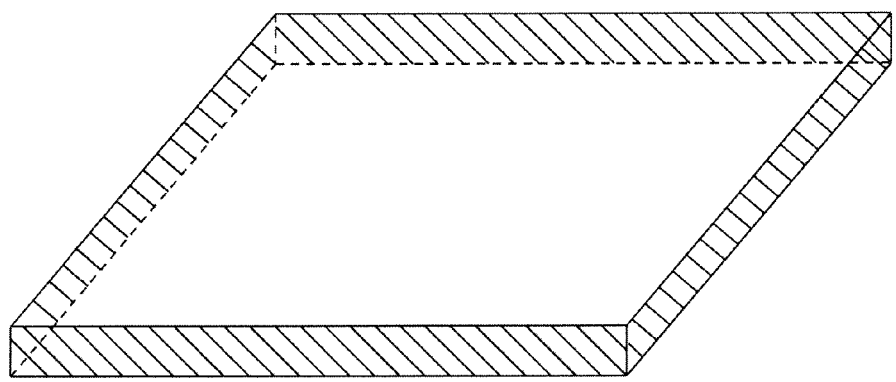
FIG. 2 is an exemplary oblique perspective view showing an electrode catalyst layer of the present invention.

FIGS. 1A to 1H are schematic cross-section diagrams illustrating a process of manufacturing method of a membrane electrode assembly (MEA) according to this embodiment of the present invention. As illustrated in FIG. 1H, a membrane electrode assembly A according to this embodiment of the present invention includes a polymer electrolyte layer 1, a first electrode catalyst layer 2 and a second electrode catalyst layer 3. Since the first electrode catalyst layer 2 and the second electrode catalyst layer 3 are covered with the polymer electrolyte layer 1 with respect to all surfaces including cross sectional surfaces, electrical contacts between the polymer electrolyte layer 1 and the first electrode catalyst layer 2 (or the second electrode catalyst layer 3) are improved and ionic resistance therebetween are reduced. As a result, the MEA has a high level of proton conductivity and a good power generation performance under a low humidified condition because the electrode catalyst layer retains moisture even under a low humidified condition. The cross sectional surfaces of the first electrode catalyst layer 2 and the second electrode catalyst layer 3 refers to (four) surfaces of the first electrode catalyst layer 2 and the second electrode catalyst layer 3 which are shaded with oblique lines in FIG. 2.

Next, a manufacturing method of the membrane electrode assembly A of this embodiment of the present invention is described below referring to FIG. 1A to FIG. 1H.

First, a catalyst ink 2" for forming the first electrode catalyst layer which contains catalyst loaded particles, a polymer electrolyte and a solvent are prepared and coated on the substrate S to form a coated layer 2' as is shown in FIG. 1A.

Then, the solvent is removed from the coated layer 2' which is the catalyst ink 2" for forming the first electrode catalyst layer coated on the substrate S so that the first electrode catalyst layer 2 is formed on the substrate S as is shown in FIG. 1B.

Subsequently, an electrolyte ink 1" which contains a polymer electrolyte and a solvent is prepared and coated on the first electrode catalyst layer 2 in a way that the first electrode catalyst layer 2 including its four cross sectional surfaces is entirely surrounded and covered with the electrolyte ink 1" so that a coated layer 1' is formed as is shown in FIG. 1C.

Then, the solvent is removed from the coated layer 1' which is the electrolyte ink 1" for forming the first electrode catalyst layer coated on the first electrode catalyst layer 2 so that the polymer electrolyte layer 1 is formed as is shown in FIG. 1D.

Subsequently, a catalyst ink 3" for forming a second electrode catalyst layer which contains catalyst loaded particles, a polymer electrolyte and a solvent is prepared and coated on the polymer electrolyte layer 1 to form a coated layer 3' as is shown in FIG. 1E. At this time, it is preferable that the solvent in the electrolyte ink 1" and the solvent in the catalyst ink 3" are the same material in order to form the coated layer 3' surrounded by the polymer electrolyte layer 1 as is shown in FIG. 1E. In addition, it is more preferable that the polymer electrolyte contained in the electrolyte ink 1" and the polymer electrolyte contained in the catalyst ink 3" are the same material.

Then, the solvent is removed from the coated layer 3' which is the catalyst ink 3" for forming the first electrode catalyst layer coated on the polymer electrolyte layer 1 so that the second electrode catalyst layer 3 is formed on the polymer electrolyte layer 1 as is shown in FIG. 1F.

Finally, the membrane electrode assembly A which includes the first electrode catalyst layer 2, the polymer electrolyte layer 1 and the second electrode catalyst layer 3 is obtained by removing the substrate S as is shown in FIG. 1H. In the case where a gas diffusion layer or a separator is used as the substrate as is described later, it is unnecessary to remove the substrate from the membrane electrode assembly A.

It is possible to increase production efficiency by using the manufacturing method of a membrane electrode assembly A of this embodiment of the present invention since the first electrode catalyst layer 2, the polymer electrolyte layer 1 and the second electrode catalyst layer 3 are stacked in order. Thus, the membrane electrode assembly A is manufactured at low costs.

In addition, a membrane electrode assembly of this embodiment of the present invention provides sufficient electrical contacts between the polymer electrolyte layer 1 and the first electrode catalyst layer 2 or the second electrode catalyst layer 3 so that the ionic resistance at the interface between the polymer electrolyte layer 1 and the first electrode catalyst layer or the second electrode catalyst layer 3 is reduced.

In addition, a manufacturing method of a membrane electrode assembly of this embodiment of the present invention does not require a hot press process, which is an inevitable process in the conventional manufacturing method of MEA in which electrode catalyst layers are transferred to both sides of a polymer electrolyte layer by hot press. Without hot press process, it is possible to prevent decease in membrane strength and ion exchange capability caused by damages to the polymer electrolyte layer due to heat and pressure of the hot press.

In addition, a thickness of the polymer electrolyte layer interposed between a pair of electrode catalyst layers can be reduced in a membrane electrode assembly A of this embodiment of the present invention. In a conventional method for manufacturing an MEA, in which electrode catalyst layers formed on a gas diffusion layers are transferred onto both surfaces of a polymer electrolyte layer by hot press, there is a problem of electrical short during power generation and/or a decrease in circuit voltage of MEA due to gas leakage caused by carbon fibers which is included in the gas diffusion layer and sting the electrode catalyst layers and the polymer electrolyte layer. Thus, a large thickness is required to the polymer electrolyte layer in the conventional method for manufacturing an MEA, in which electrode catalyst layers are transferred onto both surfaces of a polymer electrolyte layer by hot press.

In contrast, it is possible to omit the hot press process and reduce thickness of the polymer electrolyte layer in the method for manufacturing membrane electrode assembly A of this embodiment of the present invention. Specifically, the thickness of the polymer electrolyte layer 1 can be 20 µm or less. In addition, a membrane electrode assembly A having a polymer electrolyte layer with such a small thickness has improved power generation performance because of low membrane resistance.

In addition, in a membrane electrode assembly A of this embodiment of the present invention, the first electrode catalyst layer 2 and the second electrode catalyst layer 3 is entirely (including four cross sectional surfaces) covered with the polymer electrolyte layer 1. Therefore, the power generation performance is improved because high proton conductivity is achieved due to a high level of moisture retention capability of the first electrode catalyst layer 2 and the second electrode catalyst layer 3 especially under a low humidified condition. Although the first electrode catalyst layer 2 and the second electrode catalyst layer 3 in the embodiment illustrated in FIG. 1 is entirely (including four cross sectional surfaces) covered with the polymer electrolyte layer 1, moisture retention capability is improved if at least one surface of the first electrode catalyst layer 2 or the second catalyst layer 3 are covered with the polymer electrolyte layer 1. Number of surfaces which electrically contact with the polymer electrolyte layer in the electrode catalyst layer may also be two or three. Moreover, both the first electrode catalyst layer 1 and the second electrode catalyst layer 3 have cross sectional surfaces which electrically contact with the polymer electrolyte layer 1. Accordingly, the electrode catalyst layer is prevented from drying up from exposed cross sectional surfaces.

In addition, it is preferable in the manufacturing method of a membrane electrode assembly A of this embodiment of the present invention that the polymer electrolyte contained in the first catalyst ink 2", the polymer electrolyte contained in the electrolyte ink 1" and the polymer electrolyte contained in the second catalyst ink 3" include the same material. If each of these inks includes the same polymer electrolyte, a contact between the polymer electrolyte layer 1 and the first electrode catalyst layer or the second electrode catalyst layer can be improved so that ionic resistance at the interface between the polymer electrolyte layer 1 and the first electrode catalyst layer 2 or the second electrode catalyst layer 3 is reduced.

Hence, the manufacturing method of a membrane electrode assembly has high level of production efficiency and it is possible by this method to provide a membrane electrode assembly A in which the polymer electrolyte layer 1 and the first electrode catalyst layer 2 or the electrode catalyst layer 3 are sufficiently contacted and ionic resistance between the polymer electrolyte layer 1 and the electrode catalyst layer 2 or the second electrode catalyst layer 3 is small and in which sufficient power generation performance is achieved at a low cost.

A membrane electrode assembly A according to an embodiment of the present invention and the manufacturing method thereof, and further, a fuel cell according to an embodiment of the present invention will be described in detail below.

(Catalyst Ink)

There is no particular limitation to the solvent used as a dispersion medium of the catalyst ink according to an embodiment of the present invention as long as the polymer electrolyte can be dissolved with high flowability or dispersed as micro gel in the solvent while not eating away the catalyst particles or polymer electrolyte. Desirably, the solvent contains at least a volatile liquid organic solvent, and examples of the solvent include, but are not limited to, alcohols such as methanol, ethanol, 1-propanol, 2-propanol, 1-buthanol, 2-buthanol, isobutyl alcohol, tert-butyl alcohol, and pentanol, ketone solvents such as acetone, methyl ethyl ketone, pentanone, methyl isobutyl ketone, heptanone, cyclohexanone, methyl cyclohexanone, acetonylacetone, and diisobutyl ketone, ether solvents such as tetrahydrofuran, dioxane, diethylene glycol dimethyl ether, anisole, methoxytoluene, and dibutyl ether, and polar solvents such as dimethylformamide, dimethylacetoamide, N-methylpyrrolidone, ethylene glycol, diethylene glycol, diacetone alcohol, and 1-methoxy-2-propanol. Mixtures of any combination of these solvents can also be used.

The solvent in which lower alcohol is used has a high risk of firing. When such solvent is used, preferably the solvent is used as a mixture with water, and the water highly soluble in polymer electrolyte may be contained. There is no particular limitation to a water additive amount unless the water is separated from the polymer electrolyte to generate white turbidity or turn into a gel.

For the catalyst material (hereinafter also referred to as "catalyst particles" or "catalyst") used in an embodiment of the present invention, metals such as iron, lead, copper, chromium, cobalt, nickel, manganese, vanadium, molybdenum, gallium, and aluminum and alloys, oxides, or multiple oxides thereof can be used in addition to platinum group elements such as platinum, palladium, ruthenium, iridium, rhodium, and osmium. Preferably, the particle diameter of the catalyst ranges from 0.5 nm to 20 nm. When the particle diameter of the catalyst exceeds 20 nm, a surface area of the catalyst is reduced to degrade the power generation performance. When the particle diameter of the catalyst is lower than 0.5 nm, sintering is easily generated to degrade durability of the catalyst. Particularly preferably the particle diameter of the catalyst ranges from 1 nm to 5 nm.

Carbon particles are used as the electron conducting material that loads the above-described catalyst. Any type of carbon particle may be used as long as the carbon particle has a fine-particle shape, conductivity, and a catalyst-resistant property. For example, carbon black, graphite, activated carbon, carbon fiber, carbon nanotube, and fullerene can be used as the carbon particle. Preferably, the particle diameter of the carbon particle ranges from 10 nm to 1000 nm. When the particle diameter of the carbon particles is lower than 10 nm, the electron conducting path is hardly formed. When the particle diameter of the carbon particles exceeds 1000 nm, the gas diffusion properties of the first electrode catalyst layer 2 and second electrode catalyst layer 4 are decreased to degrade a utilization ratio of the catalyst. Preferably, the particle diameter of the carbon particle ranges from 10 nm to 100 nm. In the catalyst ink of this embodiment of the present invention, the electron conducting material which does not load the catalyst can be used. Carbon particles are used as the electron conducting material which does not load the catalyst.

The polymer electrolyte contained in the catalyst ink has proton conductivity, and particularly perfluorosulfonated polymers such as Nafion (a product name, registered trademark of DuPont), Flemion (a product name, registered trademark of ASAHI GLASS CO., LTD.), and Aciplex (a product name, registered trademark of Asahi Kasei Chemical Corporation) can be used as the solid polymer electrolyte. Hydrocarbon electrolytes such as sulfonated PEEK (polyether ether ketone), PES (polyether sulfone), and PI (polyimide) can also be used as the solid polymer electrolyte.

The first electrode catalyst layer 2 and the second electrode catalyst layer 3 can be formed by coating and drying the catalyst inks 2" for the first electrode catalyst layer, and 3" for the second catalyst layer.

(Substrate S)

For example, a separator, GDL, and glass etc. can be used as the substrate S in this embodiment of the present invention.

In addition, polymer films such as polyimide, polyethylene terephthalate (PET), polyparabanic acid aramid, polyamide (nylon), polysulfone, polyether sulfone, polyphenylene sulfide, polyether ether ketone, polyether imide, polyacrylate, and polyethylene naphthalate can be used as the substrate S.

Additionally, heat-resistant fluorine resins such as ethylene tetrafluoroethylen copolymer (ETFE), tetrafluoroethylen-hexafluoropropylene copolymer (FEP), tetrafluoroperfluoro-alkylvinylether copolymer (PFA), and polytetrafluoroethylene (PTFE) can also be used as the substrate S. A polymer film may be bonded onto glass to form the substrate S using a bonding agent.

The substrate S according to an embodiment of the present invention having small center line average roughness Ra is preferably used. Specifically, preferably the center line average roughness Ra is 5 $\mu$m or less, more preferably the center line average roughness Ra is 1 $\mu$m or less. When the center line average roughness Ra exceeds 5 $\mu$m, the first electrode catalyst layer 2, the second electrode catalyst layer 3 and the polymer electrolyte layer 1 cannot smoothly and stably be coated.

(Electrolyte Ink 1")

The polymer electrolyte contained in the electrolyte ink used in this embodiment of the present invention is a membrane having proton conductivity, and particularly a membrane of perfluorosulfonated polymers such as Nafion (a product and a registered trademark of DuPont), Flemion (a product and a registered trademark of Asahi Glass Co., Ltd.), and Aciplex (a product and a registered trademark of Asahi Kasei Chemical Corporation) can be used as the polymer electrolyte. Hydrocarbon electrolytes such as sulfonated PEEK (polyether ether ketone), PES (polyether sulfone), and PI (polyimide) can also be used as the polymer electrolyte.

There is no particular limitation to the solvent used as a dispersant of the electrolyte ink 1" in this embodiment of the present invention as long as the solvent never chemically reacts with the catalyst particles and the polymer electrolyte and is able to dissolve or disperse the polymer electrolyte as something like a micro gel in a highly fluid state. It is, however, preferable in the solvent that at least one volatile organic solvent is contained although it is not necessary. Usually, alcohols such as methanol, ethanol, 1-propanol, 2-propanol, 1-butanol, 2-butanol, isobutyl alcohol, t-butyl alcohol and pentanol etc., ketone solvents such as acetone, methyl ethyl ketone, pentanone, methyl isobutyl ketone, heptanone, cyclohexanone, methyl cyclohexanone, acetonylacetone and diisobutyl ketone etc., ether solvents such as tetrahydrofuran, dioxane, diethylene glycol dimethyl ether, anisole, methoxytoluene and dibutyl ether etc., other polar solvents such as dimethylformamide, dimethylacetoamide, N-methylpyrrolidone, ethylene glycol, diethylene glycol, diacetone alcohol and 1-methoxy-2-propanol etc. are used. In addition, solvent mixtures of any combination of these can also be used.

Preferably, the viscosity of the electrolyte ink 1" used in an embodiment of the present invention ranges from 100 cP to 300 cP. When the viscosity of the electrolyte ink 1" is lower than 100 cP, workability is degraded due to the low viscosity. When the viscosity exceeds 300 cP, the uniform film is hardly formed due to the high viscosity.

The polymer electrolyte layer 1 can be formed by coating and drying the electrolyte ink 1".

Preferably, the polymer electrolyte layer 1 has a thickness of 25 μm or less. When the polymer electrolyte layer 1 has the thickness of 25 μm or less, the film resistance can be decreased to improve the power generation characteristic. When the power generation is performed under a low-humidification condition, water generated in an air electrode (cathode) 7 is reversely diffused to wet the polymer electrolyte layer 1, which allows the power generation performance to be easily maintained. From the standpoint of strength of the membrane electrode assembly A to be formed, preferably the polymer electrolyte layer 1 has the thickness of 10 μm or more.

It is preferable in a membrane electrode assembly A of this embodiment of the present invention that the polymer electrolyte layer 1 which is formed on the same plane as the first electrode catalyst layer 2 is four (or more) times as large in area as the first electrode catalyst layer 2. The reason is a gas leakage tends to occur around the interface between the polymer electrolyte layer 1 and the first electrode catalyst layer 2 if the polymer electrolyte layer 1 is smaller. Similarly, it is preferable in a membrane electrode assembly A of this embodiment of the present invention that the polymer electrolyte layer 1 which is formed on the same plane as the second electrode catalyst layer 3 is four (or more) times as large in area as the first electrode catalyst layer 3.

A fuel cell in which the sequentially stacking type membrane electrode assembly (MEA) A according to an embodiment of the present invention is used will be described below.

Figure 3:
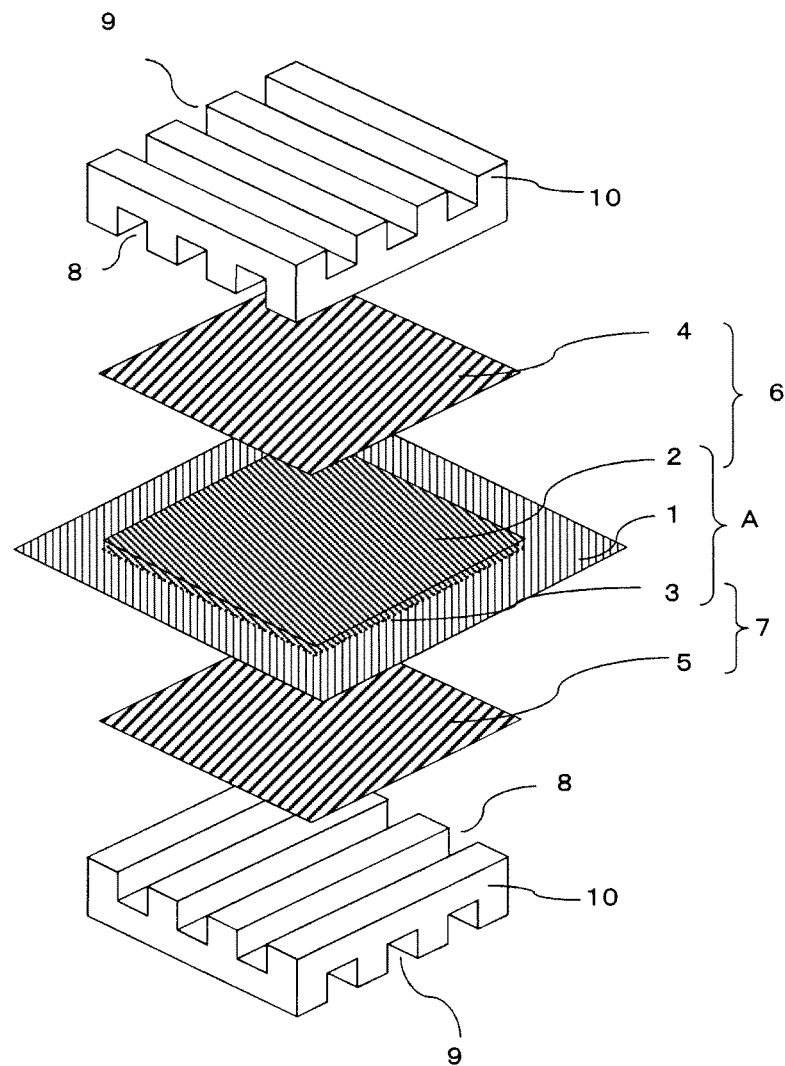
FIG. 3 is an exploded exemplary diagram showing a fuel cell of the present invention.

FIG. 3 is an exploded schematic diagram illustrating a fuel cell according to an embodiment of the present invention. As illustrated in FIG. 3, the fuel cell according to an embodiment of the present invention includes a membrane electrode assembly A, which has the first electrode catalyst layers 2 and the second electrode catalyst layer 3 on both sides the polymer electrolyte layer 1, and a gas diffusion layer on fuel electrode 4 and a gas diffusion layer on air electrode 5 are arranged facing the first electrode catalyst layer 2 and the second catalyst layer 3, respectively. Accordingly, a fuel electrode (anode) 6 and an air electrode (cathode) 7 are formed. A pair of separators 10 is disposed in the fuel cell. The separator 10 includes a gas flow path 8 through which gas is passed and a cooling water path 9 that is provided in a principal surface to pass cooling water therethrough, and the separator 10 is made of a conductive and impermeable material. For example, gas containing hydrogen is supplied as the fuel gas from the gas flow path 8 of the separator 10 on the side of the fuel electrode 6. An electrode reaction is generated between hydrogen and oxygen that is of the gas on the air electrode side in the presence of the catalyst, which allows electromotive force to be generated between the fuel electrode 6 and the air electrode 7.

As illustrated in FIG. 3, the fuel cell has a so-called single cell structure in which the polymer electrolyte layer 1, the first electrode catalyst layers 2, the second electrode catalyst layer 3, the gas diffusion layer on fuel electrode 4, and the gas diffusion layer on air electrode 5 are arranged between a pair of separators 10. In this embodiment of the present invention, a plurality of cells are stacked with the separator 10 interposed therebetween, thereby forming the fuel cell.

A conductive material having a gas diffusion property can be used as the gas diffusion layer. Specifically, porous carbon materials such as carbon cloth, carbon paper, and nonwoven cloth can be used as the gas diffusion layer. The gas diffusion layer can also be used as the substrate S. At this point, it is not necessary to peel off the substrate S that is of the gas diffusion layer after the bonding process.

When the gas diffusion layer is used as the substrate S, a filler layer (which is not shown in FIGs.) may be formed on the gas diffusion layer before the catalyst ink 2" for first electrode catalyst layer is coated. The filler layer prevents the catalyst ink from seeping into the gas diffusion layer, and the catalyst ink deposits on the filler layer to form a three-phase interface even in the small coating amount of the catalyst ink. For example, carbon particles are dispersed in a fluororesin solution and the sintering is performed at a temperature of (or higher than) the melting point of the fluororesin, which allows the filler layer to be formed. For example, polytetrafluoroethylene (PTFE) can be used as the fluorine resin.

A carbon type or a metallic type can be used as the separator 10. The gas diffusion layer and the separator 10 may integrally be formed. When the separator 10 or the electrode catalyst layer acts as the gas diffusion layer, it is not necessary to arrange the gas diffusion layer.

EXAMPLE

Example

Although an example of the present invention will be described below, the present invention is not limited to the example.

<Preparation of Catalyst Inks for First Electrode Catalyst Layer 2" and Second Electrode Catalyst Layer 3">

A platinum loaded carbon catalyst (product name: TEC10E50E, a product of Tanaka Kikinzoku Kogyo K.K.) on which 50% by weight of platinum is loaded and Nafion (registered trademark, a product of DuPont) which is a 20% by weight of solution of polymer electrolyte were mixed in a solvent, and a dispersion treatment was performed with a planetary ball mill (product name: Pulverisette 7, made by FRITSCH GmbH). A zirconia pot and zirconia balls were used for the ball mill.

A dispersion liquid which has a ratio of 2:1 by weight of the carbon particles in the platinum loaded carbon relative to Nafion as a composition ratio of the starting materials was used as the catalyst ink for the first electrode catalyst layer 2" and the catalyst ink for the second electrode catalyst layer 3". A 1:1 by volume mixture of methanol and ethanol was used as the solvent. (or A dispersion liquid with a 2:1 composition ratio of the starting materials, in which the weight ratio of the carbon particles in the platinum loaded carbon relative to Nafion is 2:1, was used as the catalyst ink for the first electrode catalyst layer 2" and the catalyst ink for the second electrode catalyst layer 3". A 1:1 by volume mixture of methanol and ethanol was used as the solvent.) (or The catalyst ink for the first electrode catalyst layer 2" and the catalyst ink for the second electrode catalyst layer 3" were prepared by setting the composition ratio of the starting materials, namely, the weight ratio of the carbon particles in the platinum loaded carbon relative to Nafion to 2:1.)

<Electrolyte Ink 1">

Nafion (a registered trademark, made by DuPont), which is a 20% by weight of polymer electrolyte solution, is used as the electrolyte ink 1".

<Substrate S>

A polymer film (poly (ethylene-tetrafluoroethylene) or ETFE) was pasted on a glass with a tackiness agent and was used as the underlying substrate S.

<Formation of First Electrode Catalyst Layer 2>

The catalyst ink for the first electrode catalyst layer 2" was coated onto the substrate S with a doctor blade, and the catalyst ink for first electrode catalyst layer 2" was dried at a temperature of 80° C. for 5 minutes to form the first electrode catalyst layer 2. In forming, the first electrode catalyst layer 2 was adjusted to have such a large thickness that about 0.3 mg/cm$^2$ of platinum was included therein and, in addition, to have an electrode area as large as 5 cm$^2$ by a masking method.

<Preparation of Polymer Electrolyte Layer 1>

The electrolyte ink 1" was coated onto the 5 cm$^2$ of first electrode catalyst layer 2 with the doctor blade, and the electrolyte ink 1" was dried for 5 minutes in an oven in which the temperature was set at 60° C. immediately after the coating, thereby preparing the polymer electrolyte layer 1. Then, the polymer electrolyte layer 1 was dried for 10 minutes in a drying machine in which temperature was set at 80° C. in vacuum, thereby preparing the polymer electrolyte layer 1. The thickness of the polymer electrolyte layer 1 was set to 25 μm by adjusting a gap with a blade of the doctor blade.

(Preparation of Second Electrode Catalyst Layer 3)

The catalyst ink for second electrode catalyst layer 3" was coated onto the polymer electrolyte layer 1 with the doctor blade, and the catalyst ink for second electrode catalyst layer 3" was dried for five minutes to form the second electrode catalyst layer 3. The thickness of the second electrode catalyst layer 4 was adjusted such that the platinum loading amount became about 0.3 mg/cm$^2$. In forming, the second electrode catalyst layer 3 was adjusted to have such a large thickness that about 0.3 mg/cm$^2$ of platinum was included therein, in addition, to have an electrode area as large as 5 cm$^2$ by a masking method.

Comparative Example

<Substrate S>

A PTFE sheet was used as a transfer sheet.

<Formation of Electrode Catalyst Layer>

The substrate was fixed on a glass plate. The catalyst ink for forming an electrode catalyst layer was coated on the substrate with a doctor blade and dried in an oven at 80° C. to form an electrode catalyst layer. In forming, the electrode catalyst layer was adjusted to have such a large thickness that about 0.3 mg/cm$^2$ of platinum was included therein.

<Substrate S>

A polymer film (poly(ethylene-tetrafluoroethylene) or ETFE) which was pasted onto the glass using the bonding agent was used as the underlying substrate <Formation of Polymer Electrolyte Layer>

A polymer electrolyte solution was coated on the substrate with the doctor blade, and then immediately, dried in an oven at 60° C. to form a polymer electrolyte layer. Afterwards, the polymer electrolyte layer was further dried in a drying machine in which the temperature was 80° C. and a vacuum condition was maintained.

The thickness of the polymer electrolyte layer was set to 25 μm by adjusting a space left by a blade of the doctor blade.

<Fabrication of MEA>

An electrode catalyst layer on the PTFE sheet was stamped out in 5 cm$^2$ square. Then, a pair of the transfer sheets was arranged facing both sides of the polymer electrolyte layer made from the polymer electrolyte solution. A hot press was performed under a condition of 6.0×10$^6$ Pa and 130° C. so that an MEA was fabricated.

<Power Generation Performance>

A pair of carbon cloths was stuck as the gas diffusion layers to a membrane electrode assembly A obtained in the example and comparative example after the underlying substrate S was peeled off. The membrane electrode assembly A was arranged in a power generation evaluation cell (made by NF Corporation). Then, a current-voltage measurement was performed under an operating condition noted below using a fuel-cell-dedicated electronic loads (product name: GFI-SF1, made by Toyo Corporation) at a cell temperature of 80° C. Flows of hydrogen, which was used as the fuel gas, and air, which was used as the oxidant gas, were controlled to obtain a constant flow rate condition. The back pressure was set to 100 kPa. The humidity of the anode and cathode was adjusted to 40% RH by the humidifier, respectively.

Power generation performances of the MEA obtained in the examples and comparative examples were measured. As a result, it was confirmed that the MEA of the examples had better power performances than the MEA of the comparative examples.

The present invention can increase power generation performance under a low humidified condition because of high moisture-retaining property since the first electrode catalyst layer 2 and the second electrode catalyst layer 3 were covered with polymer electrolyte layer 1 in four directions including cross sectional surface.

Industrial Applicability

The present invention can be applied to a PEFC (or PEMFC) which is used in an electric car, a cell phone, a vending machine, an underwater robot, a submarine, a space ship, an underwater transporter or a power supply for an underwater base etc.

What is claimed is:

1. A membrane electrode assembly comprising:
   a polymer electrolyte layer;
   a first electrode catalyst layer; and
   a second electrode catalyst layer, wherein
   all cross sectional surfaces of said first electrode catalyst layer are covered with said polymer electrolyte layer, wherein
   in part said polymer electrolyte layer is formed in the same plane as said first electrode catalyst layer, and wherein
   total area of parts of said polymer electrolyte layer which are formed in the same plane as said first electrode catalyst layer is four or more times larger than total area of said first electrode catalyst layer in said same plane.

2. The membrane electrode assembly according to claim 1, wherein an identical polymer electrolyte material is contained in said polymer electrolyte layer and said first electrode catalyst layer.

3. A fuel cell comprising:
said membrane electrode assembly according to claim 2;
a pair of gas diffusion layers; and
a pair of separators, wherein said membrane electrode assembly is interposed between said pair of gas diffusion layers and said pair of gas diffusion layers are interposed between said pair of separators.

4. A membrane electrode assembly comprising:
a polymer electrolyte layer;
a first electrode catalyst layer; and
a second electrode catalyst layer, wherein
all cross sectional surfaces of said first electrode catalyst layer and all cross sectional surfaces of said second electrode catalyst layer are covered with said polymer electrolyte layer, wherein
in part said polymer electrolyte layer is formed in the same plane as said second electrode catalyst layer, and wherein
total area of parts of said polymer electrolyte layer which are formed in the same plane as said second electrode catalyst layer is four or more times larger than total area of said second electrode catalyst layer in said same plane.

5. The membrane electrode assembly according to claim 4, wherein an identical polymer electrolyte material is contained in said polymer electrolyte layer and said first electrode catalyst layer.

6. A fuel cell comprising:
said membrane electrode assembly according to claim 5;
a pair of gas diffusion layers; and
a pair of separators, wherein said membrane electrode assembly is interposed between said pair of gas diffusion layers and said pair of gas diffusion layers are interposed between said pair of separators.

* * * * *